(12) United States Patent
Wihlborg

(10) Patent No.: US 8,000,652 B2
(45) Date of Patent: Aug. 16, 2011

(54) SENDING AND RECEIVING INFORMATION

(75) Inventor: Anders Wihlborg, Rydeback (SE)

(73) Assignee: Sony Ericsson Mobile Communications AB, Lund (SE)

( * ) Notice: Subject to any disclaimer, the term of this patent is extended or adjusted under 35 U.S.C. 154(b) by 738 days.

(21) Appl. No.: 12/029,144

(22) Filed: Feb. 11, 2008

(65) Prior Publication Data

US 2009/0203332 A1    Aug. 13, 2009

(51) Int. Cl.
*H04H 20/71* (2008.01)
*H04H 40/00* (2008.01)
*H04B 7/00* (2006.01)

(52) U.S. Cl. ........ 455/39; 455/3.01; 455/41.2; 455/66.1; 398/140

(58) Field of Classification Search ........ 455/41.1–41.3, 455/91, 130, 3.01, 3.06, 66.1; 375/242, 246, 375/253, 256, 260, 272–276, 329–337, 303, 375/308; 398/47–48, 68–69, 75, 79, 130, 398/140–141, 182, 202
See application file for complete search history.

(56) References Cited

U.S. PATENT DOCUMENTS

| | | | |
|---|---|---|---|
| 5,243,608 A | | 9/1993 | Chawki et al. |
| 5,541,756 A | | 7/1996 | Chang-Hasnain et al. |
| 5,946,118 A | * | 8/1999 | Flaherty .................... 398/79 |
| 6,014,236 A | * | 1/2000 | Flaherty ..................... 398/66 |
| 6,310,707 B1 | * | 10/2001 | Kawase et al. ............. 398/119 |
| 6,734,952 B2 | * | 5/2004 | Benz et al. ................ 356/5.01 |
| 7,116,709 B2 | * | 10/2006 | Tanaka et al. ............. 375/239 |
| 7,349,668 B2 | * | 3/2008 | Ilan et al. ................... 455/66.1 |
| 2002/0002643 A1 | | 1/2002 | Yamamoto et al. |
| 2002/0131128 A1 | * | 9/2002 | Myers et al. .............. 359/161 |
| 2004/0208645 A1 | * | 10/2004 | Buckman ................... 398/186 |
| 2005/0119032 A1 | | 6/2005 | Airas |
| 2007/0091297 A1 | * | 4/2007 | Beller ....................... 356/73.1 |
| 2008/0064331 A1 | * | 3/2008 | Washiro .................... 455/41.1 |
| 2009/0196615 A1 | * | 8/2009 | Kauffman .................. 398/79 |

OTHER PUBLICATIONS

International Search Report issued in international application No. PCT/EP2008/057633, mailed Oct. 27, 2008, 3 pages.

* cited by examiner

*Primary Examiner* — Simon Nguyen
(74) *Attorney, Agent, or Firm* — Harrity & Harrity, LLP

(57) ABSTRACT

The present invention relates to a method in a sending device for sending information to a receiving device. The sending device is adapted to emit electromagnetic radiation with different wavelengths. The method comprises sending electromagnetic radiation of a norm wavelength to the receiving device and sending electromagnetic radiation of a second wavelength to the receiving device. The difference between the first wavelength and the second wavelength per time unit represents information to be sent to the receiving device.
The present invention also relates to a computer program for performing a method of sending information, a sending device, a method for receiving information, a receiving device and a computer program for performing a method of receiving information.

16 Claims, 7 Drawing Sheets

SENDING AND RECEIVING INFORMATION

TECHNICAL FIELD

The present invention relates to a method and apparatus for sending and/or information and, more particularly, to sending and receiving information based on the change in wavelength of emitted electromagnetic radiation.

BACKGROUND OF THE INVENTION

The television and mobile worlds are not interconnected. A user may observe something of interest on a screen, such as a TV, and may require further information. As an example, the user may see, for example, a music video on TV and want, e.g., more information about the group such as disco graphical information or maybe book some tickets for a concert. Maybe the only further information given is a reference, such as a web address, presented on the screen.

At present, however, the only option the user is given in the exemplary scenario above, is to manually enter the web address into the user's portable electronic device, such as a mobile phone. This is cumbersome, unnecessary time consuming, and may easily render misspellings, general frustration and user dissatisfaction. If the information, such as a web address, is displayed for too short time, the user may not have time to enter the web address and if the information is not easy to commit memory, the user may forget it before succeeding in acquiring the information.

Attempts to resolve this problem may be to apply any of the optical encoding systems used for printed products, such as paper products, on a screen. Some examples of such optical encoding may be a bar code or similar encoding system. Today there exist several ways to visually transfer information optically from a printed media. A common method is to detect a static complex image, a two-dimensional bar code, like EAN 13, a Shot Code, a dot based pattern code etc. This technique is however best suited for printed surfaces, and not for the displays of electronic devices such as CRT's or LCD's, etc.

It is difficult to detect such bar codes on a digital screen due to the low resolution of digital screens compared to that of printed paper. The resolution of printed media typically may be approximately 300 dpi, in contrast to the resolution of a screen, which typically may be limited to approximately 72 dpi. To use static complex images, like bar codes, may work with a high definition LCD screen, but still several attempts may be needed before succeeding, and the information is strictly size limited.

Another possible method may be to transfer a stream of simple detectable high contrast images/bars on the screen like Timex® does with their Data Link to transfer content to a watch. However, it may be experienced as disturbing and even painful for the eyes to watch for most people, not to mention the risk of triggering epileptic seizures.

Another possible solution to the addressed problem may be to let a portable electronic device comprise a camera. Such portable electronic device including a camera may be used for capturing information from another electronic device such as a TV screen. One way of capturing information on the screen, such as a web address, could be to snap a photograph of the screen and use a program for letter recognition to analyze the captured image comprising the desired piece of information. However, such a solution may presuppose e.g. that the desired information text is displayed alone, without disturbance from other texts or flashing images. Also, the camera probably will have to be within a certain range from the screen with the displayed text. Even if the enumerated problems may be solved, the risk of misinterpretation is likely to be considerable.

Thus there is a need for a robust and reliable method of transferring information from one electronic device, such as a screen, to another electronic device, such as a portable electronic device.

SUMMARY OF THE INVENTION

Embodiments of the invention obviate or reduce at least some of the above-mentioned issues and provide an improved mechanism for sending and receiving information.

According to a first aspect of the present invention, the problem is solved by a method in a sending device for sending information to a receiving device. The sending device is adapted to emit electromagnetic radiation with different wavelengths. The method comprises sending electromagnetic radiation of a norm wavelength to the receiving device and sending electromagnetic radiation of a second wavelength to the receiving device. The difference between the norm wavelength and the second wave length per time unit corresponds to information to be sent to the receiving device.

According to a second aspect of the present invention, the problem is solved by a computer program product. The computer program product comprises computer-readable program code embodied on a computer-readable medium. The computer readable program code being configured to perform the method of the first aspect.

According to a third aspect of the present invention, the problem is solved by a sending device adapted to send information to a receiving device. The sending device comprises a sending unit. The sending unit is adapted to send electromagnetic radiation of a norm wavelength and a second wavelength to the receiving device. The difference between the norm wavelength and the second wavelength per time unit represents information to be sent to the receiving device.

According to a fourth aspect of the present invention, the problem is solved by a method in a receiving device for receiving information from a sending device. The receiving device is adapted to receive electromagnetic radiation with different wave length. The method comprises receiving electromagnetic radiation of a norm wavelength from the sending device. Also, the method comprises receiving electromagnetic radiation of a second wavelength from the sending device, wherein the difference per time unit between the norm wavelength and the second wavelength represents the information to be received from the sending device.

According to a fifth aspect of the present invention, the problem is solved by a computer program product comprising computer-readable program code embodied on a computer-readable medium. The computer readable program code being configured to perform the method of the fourth aspect.

According to a sixth aspect of the present invention, the problem is solved by a receiving device adapted to receive electromagnetic radiation with different wavelengths from a sending device. The receiving device comprises a receiving unit. The receiving unit is adapted to receive electromagnetic radiation of a norm wavelength and a second wavelength. The difference between the norm wavelength and the second wavelength per time unit represents information.

Thanks to the way of encoding information, to let the difference between two emitted electromagnetic wavelengths per time unit represent information to be sent to the receiving device from a sending device, it is possible to transfer information by means of electromagnetic radiation without making a previous calibration of the sending device and the receiving device. Thereby the present methods become convenient to implement, robust and user friendly. Thus improved methods for sending and receiving information and improved devices for sending and receiving information are provided.

An advantage of the present devices, methods and computer programs is that information easily and conveniently may be transferred between two at the present not compatible systems such as e.g. a TV screen and a mobile telephone.

Another advantage of the present devices, methods and computer programs is that information may be transmitted between a sender and a receiver without using radio waves, only emitting other electromagnetic radiation such as e.g, light within or without the visible spectrum. Thus information may be transmitted also in a surrounding where the use of radio transmitters are prohibited such as e.g. in airplanes or at hospital. Also, information may be transmitted for military purpose when radio cannot be used due to enemy radio scanning.

BRIEF DESCRIPTION OF THE DRAWINGS

The present invention will now be described more in detail in relation to the enclosed drawings, in which.

DETAILED DESCRIPTION OF PREFERRED EMBODIMENTS

The present invention is defined as a sending device, a method in a sending device, a receiving device, a method in a receiving device and various computer program products which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present sending device, method in a sending device, receiving device, method in a receiving device and/or computer program products to any of the particular forms disclosed, but on the contrary, the description of the present sending device, method in a sending device, receiving device, method in a receiving device and/or or computer program products is to cover all modifications, equivalents, and alternatives falling within the scope of the invention as defined by the claims.

Figure 1:
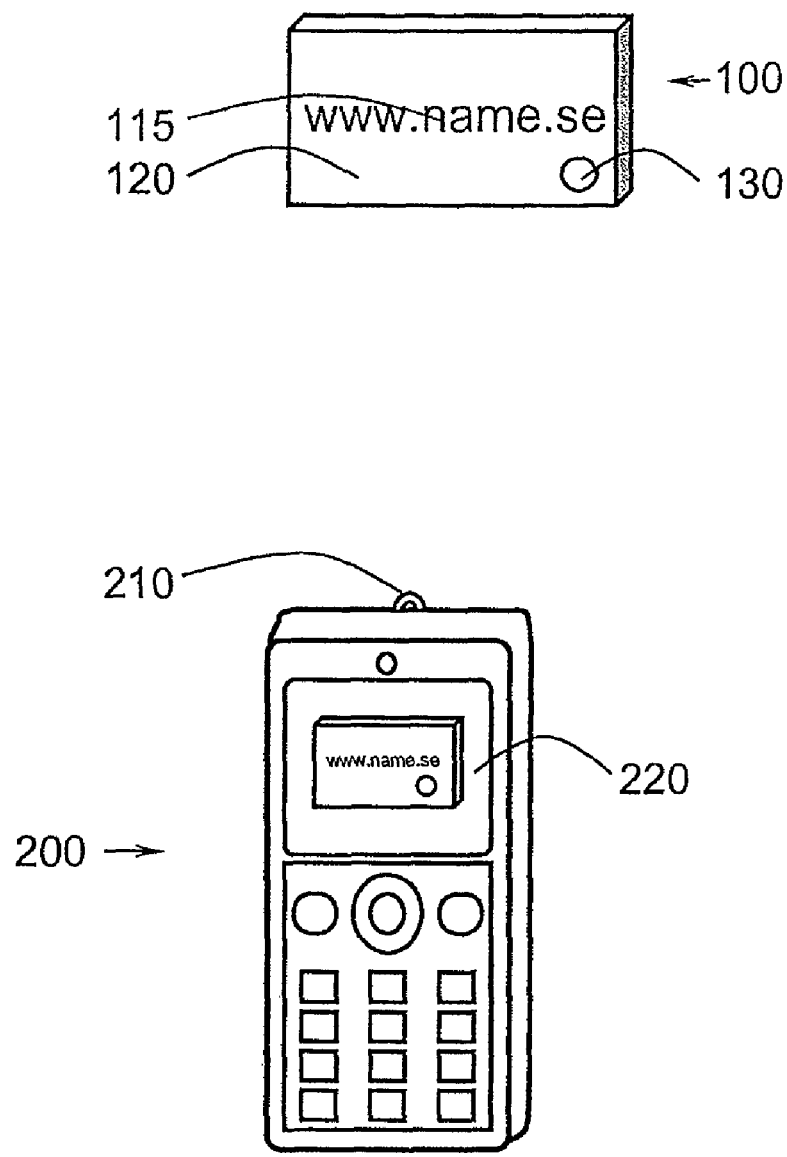
FIG. 1 is a block diagram illustrating an information sending device and an information receiving device.

FIG. 1 is a schematic illustration over an embodiment of an information sending device 100 and an information receiving device 200.

Information sending device 100, as herein described, may, in some embodiments, include a screen 120, able of presenting information 115, which information 115 may be understandable and/or read by a user. At least a certain part, hot spot 130 of screen 120 on information sending device 100 may be adapted to emit electromagnetic radiation according to the present methods, as will later be explained in detail.

Information sending device 100 may, in an embodiment, include a TV. However, according to some embodiments, information sending device 100 may comprise e.g. a computer, an advertising sign, an information display, a laptop, a notebook computer, a personal digital assistant (PDA), a mobile cellular radiotelephone, a digital enhanced cordless telecommunications (DECT) telephone, a gaming device, a digital still camera, a digital video camera, a video player, a music player such as an MP3 player or any other kind of information sending device 100.

The electromagnetic radiation emitted by information sending device 100 may be received by information receiving device 200. Information receiving device 200 may include a camera unit 210, adapted to receive electromagnetic radiation within relevant wavelength spectra. Information 115 displayed on the information sending device 100 and hot spot 130 of screen 120 may be captured in the viewfinder of information receiving device 200.

The viewfinder of information receiving device 200 may be, e.g., a charge-coupled device (CCD), a CMOS sensor, an active pixel sensor, or other device.

Hot spot 130 may be marked in some convenient way to simplify the user's identification process of the information emitting hot spot 130. Hot spot 130 may, e.g, be marked with a characteristic and easily identified logotype or other distinctive mark of arbitrary design.

Information receiving device 200, as herein described, may, in an embodiment, include a portable electronic device, such as a mobile cellular radiotelephone. According to some embodiments, however, information receiving device 200 may include a digital enhanced cordless telecommunications (DECT) telephone, a personal digital assistant (PDA), a laptop, a computer, a digital still camera, a digital video camera, or any other kind of electronic device, such as a notebook computer, walkie-talkie, hunting radio, baby monitor, a video player, a gaming device, a music player such as an MP3 player, etc. Information receiving device 200 may, in one embodiment, be a portable electronic device.

According to some embodiments, information sending device 100 may also include information receiving device 200. According to some embodiments, information receiving device 200 may also include information sending device 100. Thus, according to these embodiments, two such information sending/receiving devices 100, 200 may communicate interactively with each other, by exchanging information according to the present methods.

Figure 2A:
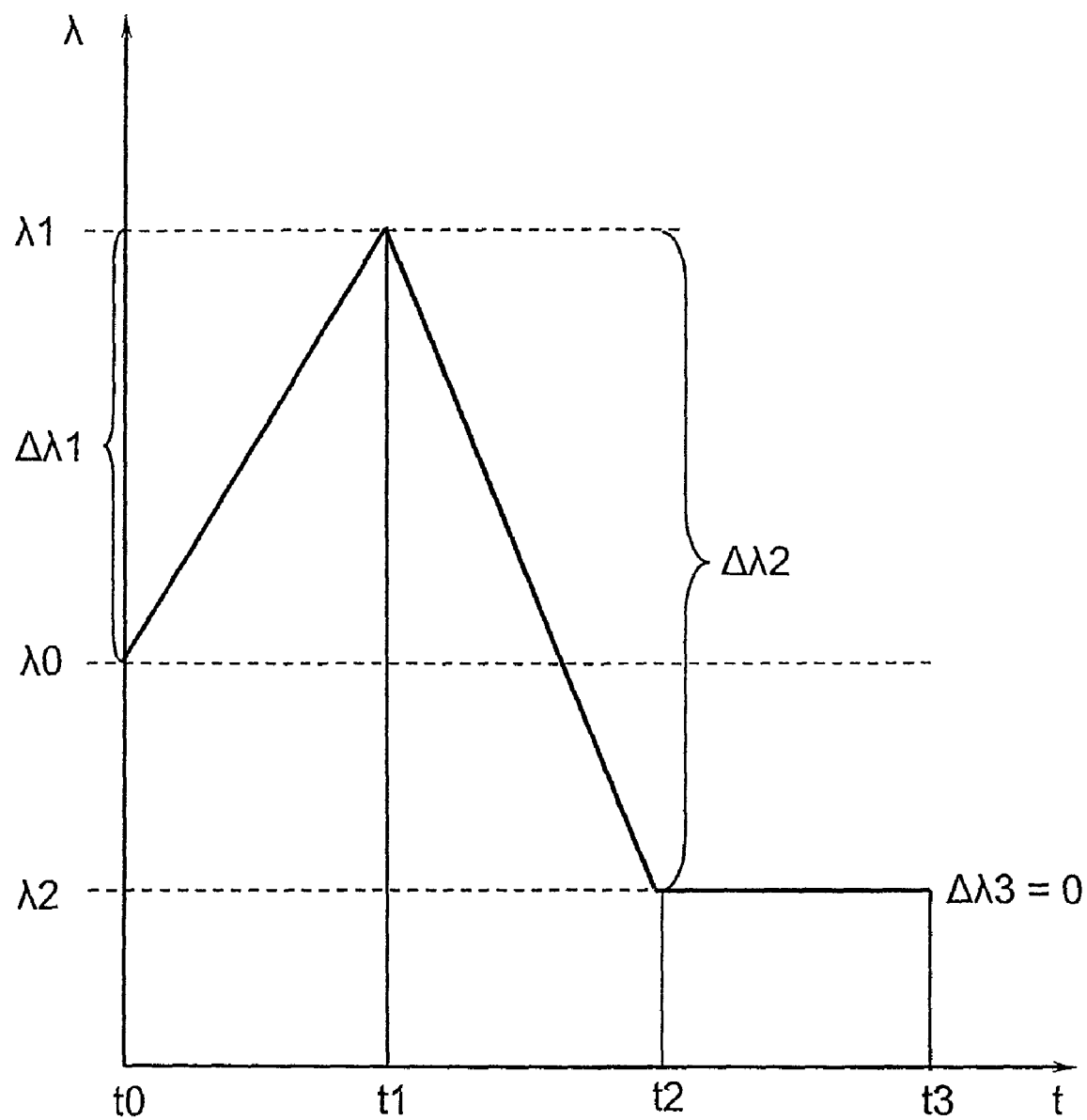
FIG. 2A is a schematic block diagram which depicts how the wavelength of the emitted electromagnetic radiation may vary over the time.

FIG. 2A is a schematic block diagram which depicts how a wavelength A of the emitted electromagnetic radiation may vary over the time t. Thus, FIG. 2A may be considered to reveal an embodiment of the present invention.

According to some embodiments, the emitted electromagnetic radiation from the information sending device 100 may be visible light with wavelength λ between approximately 400 and 750 nm.

In some embodiments, the information sending device 100 may be configured to emit (infrared) light 120 with wavelength λ of about 750 nm and 1 mm. In some embodiments, information sending device 100 may be configured to emit (ultra violet) light 120 with a wavelength λ of about 10 to about 400 nm.

However, according to some embodiments, information sending device 100 may be configured to send any other kind of electromagnetic radiation with an appropriate wavelength λ. For example, information sending device 100 may be configured to emit electromagnetic radiation in one or more spectra. (e.g., visible, infrared, and UV).

According to the present methods, wavelength λ, as such, may not be used for encoding information. Instead, it may be the difference per time unit Δλ/t is used for encoding information 115. The principle of the encoding is illustrated in FIG. 2A. Initially, electromagnetic radiation may be emitted from information sending unit 100 with wavelength λ0. At time t1, electromagnetic radiation with wavelength λ1 may be received by receiving device 200. The difference Δλ between the firstly received wavelength λ0 and the next received wavelength λ1 at time t1, is Δλ1. Thus, λ1=λ0+Δλ1. At time t2, wavelength λ emitted from information sending unit 100 is changed again to λ2. The difference Δλ between λ1 and λ2 is Δλ2. Thus, λ2=λ1+Δλ2. At the time t3, wavelength λ emitted from information sending unit 100 may remain unchanged, λ3. The difference Δλ between λ2 and λ3 is 0. Thus, λ3=λ2+Δλ3=λ2+0=λ2.

Figure 2B:
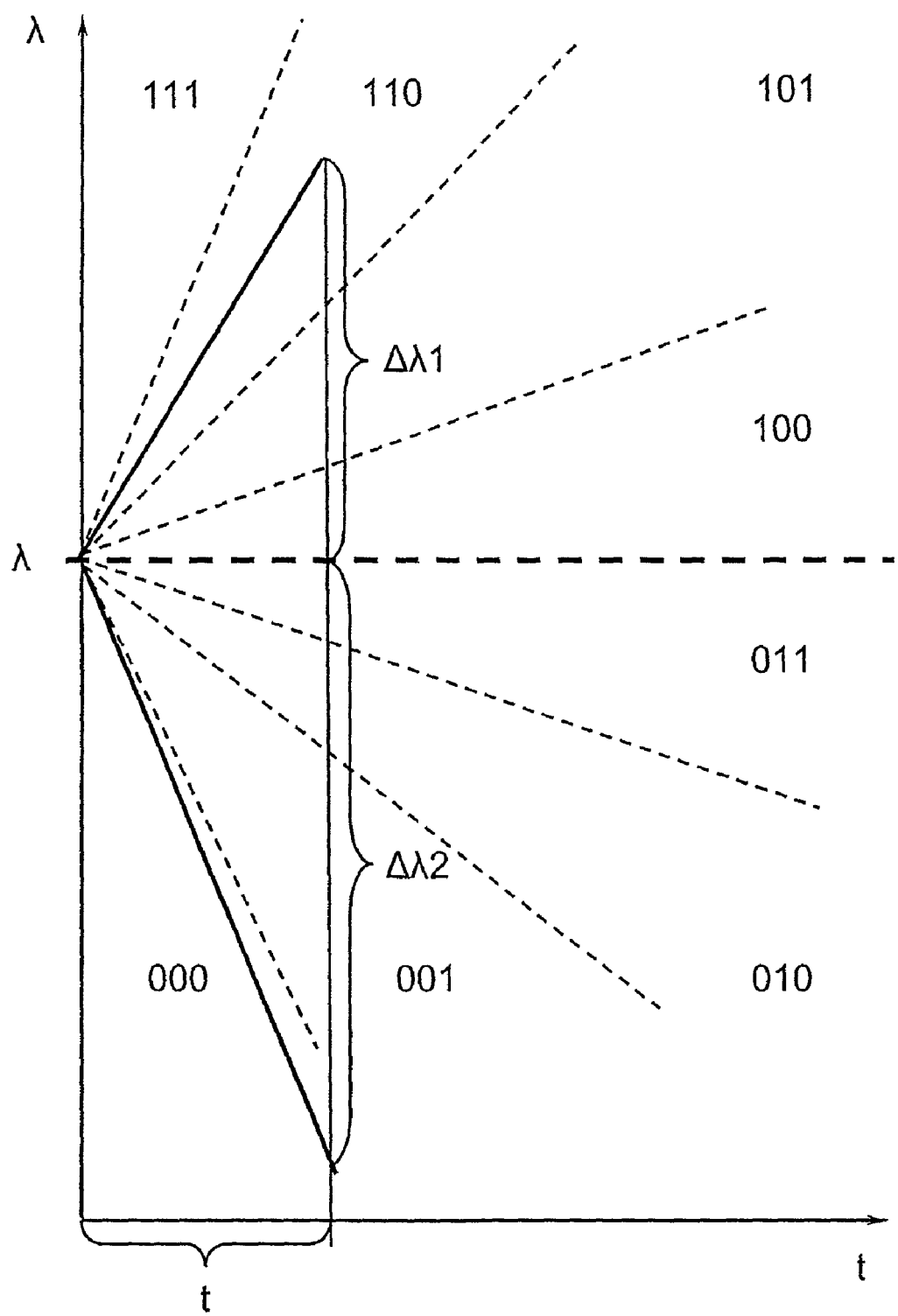
FIG. 2B is a schematic block diagram which depicts how a change in wavelength of the emitted electromagnetic radiation may be used for encoding Information.

FIG. 2B is a schematic block diagram depicting how a difference per time unit Δλ/t in wavelength λ of the emitted electromagnetic radiation may be used for encoding information. As a non-limiting example illustrated in FIG. 2B, four positive and four negative slopes, or differences per time unit Δλ/t, may be used for encoding information 115, which may be represented by binary code. Accordingly, the firstly detected difference per time unit Δλ1/t in wavelength λ of the emitted electromagnetic radiation may carry the meaning "110". The secondly detected difference per time unit Δλ2/t in wavelength λ of the emitted electromagnetic radiation may carry the meaning "000". The thirdly detected difference per time unit Δλ3/t=0 in wavelength λ of the emitted electromagnetic radiation, according to the earlier described example in FIG. 2A may carry a specific meaning, according to some embodiments.

According to some embodiments, the emitted electromagnetic radiation may include visible light with wavelength λ of about 400 to about 750 nm. According to these embodiments, the encoding may use smooth transitions in the color space as the information carrier. By detecting how the color changes over time, the derivate Δλ of the separate Red-Green-Blue (RGB) components, emitted within three different scopes of electromagnetic wavelengths λ, may be separated and decoded by receiving device 200, which may output RGB. That is, the electromagnetic radiation, or information 115, may be transmitted on three channels using a plurality of norm wavelength λ simultaneously.

An advantage with the suggested method of transmitting information is that it is aesthetically attractive to human users and also easy for a human user to detect as an information-emitting code. The method may, according to some embodiments, function as an easily identified animated trademark for the present encoding method.

The user-perceived code may comprise a smooth pulsating colored area (hot spot 130) on the screen 120 comprised within the sending device 100. Text and/or mixed-in images in the foreground on screen 120 may not interfere with the transmission since it is static. The present methods may be robust and have low requirements of both sending device 100 and receiving device 200. The method may work equally well with both cathode ray tube (CRT), liquid crystal display (LCD), plasma display panel (PDP) and other digital displays and devices do not need any color synchronization since it is the color change per time unit Δλ/t that is measured and carrying information 115, not wavelength λ itself. Further, the visual appearance of the code and hot spot 130 may in itself be a strong market identifier and incentive.

However, according to some embodiments, since the nature of derivation is base-3-, positive change, negative change, and no change, using a protocol similar to Morse Code [.], [-] and [ ], may encode the data efficiently. As an example, binary data may be transferred bit by bit with spacing between each word.

It may be noted that the time unit t which has been referred to may be a known, predetermined parameter, depending on the frequency. The frequency is a value which may be predetermined and set as a standard in order to simplify the implementation process of the present methods.

As a non-limiting example only, screen 120 on sending device 100 running at 25 Hz and using 8 color slopes or derivates per time unit Δλ/t, the theoretical transfer rate would be 1200 bit per second (25 [Hz]·8 [derivates]·2 [polarity (+ and −)]·3 [channels (red, green, blue)]).

Receiving device 200 may, according to some embodiments, run with a sampling frequency n times higher than the frequency of the sending device 100, where n is any number greater than two, for example. Thus n>2 and the sampling frequency of receiving device 200 may be, according to some embodiments, double the sending frequency used by sending device 100. Thereby the step of synchronizing sender 100 and receiver 200, which may be required if sender 100 and receiver 200 work with the same frequency, could be omitted.

According to some embodiments, the sampling frequency of receiving device 200 may be three times the frequency of sending device 100 to properly read the emitted derivates per time unit Δλ/t. Thus, if the frequency of sending device 100 is 25 Hz, for example, the sampling frequency of receiving device 200 may be 50 Hz or, with certain advantage, 75 Hz. Other sampling frequencies are possible.

By using an at least three times faster sampling frequency at receiving device 200 than sending device 100, the present method becomes more robust and the risk of misinterpreting the slope, or difference per time unit Δλ/t, is further reduced. The higher the sampling frequency is at receiving device 200 in comparison with the sending frequency at sending device 100, the more robust the present method becomes.

Figure 3:
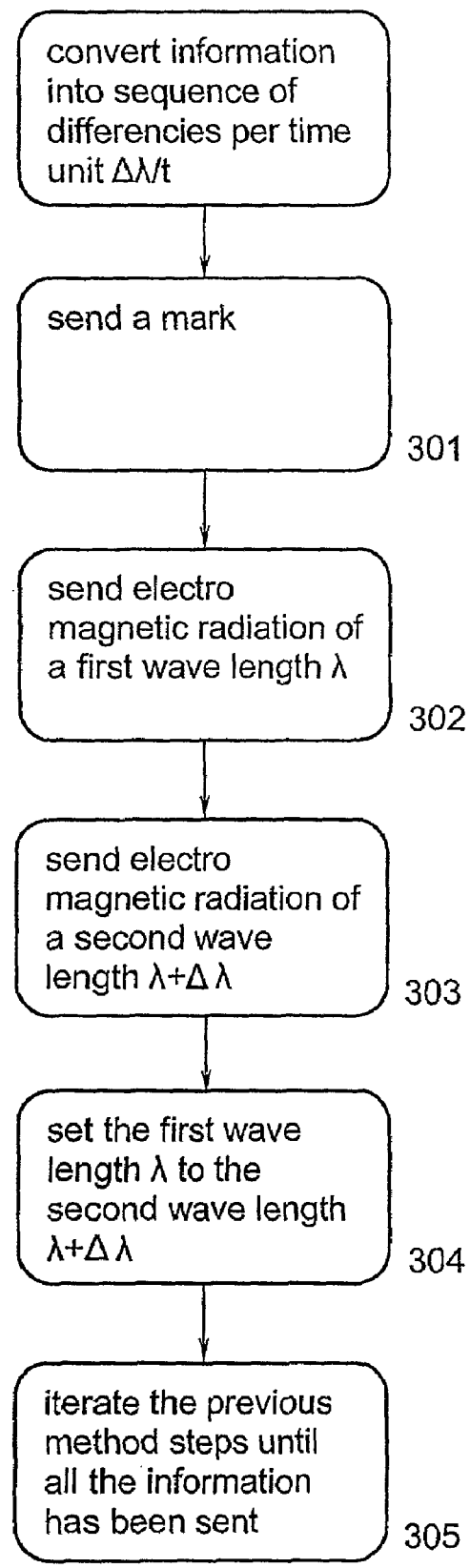
FIG. 3 is a flow chart illustrating a method in an information sending device.

FIG. 3 illustrates a method for use in an information sending device 100 for sending information 115 to receiving device 200. Sending device 100 may be configured to emit electromagnetic radiation with different wavelength λ, λ+Δλ. To send information 115, the method may include a number of steps 300-305. It is to be noted, however, that some of the described method steps are optional and only comprised within some embodiments. Further, it is to be noted that method steps 300-305 may be performed in any order and that all or at least some of method steps 300-305, e.g., steps 301 and 302, may be performed in parallel or in an altered, arbitrarily decomposed, rearranged or even completely reversed order. The method may include the following steps:

Step 300 may be optional and may only be included within some embodiments of the present method. Information 115 to be sent may be converted into a sequence of differences per time unit Δλ/t between norm wavelength λ and second wavelength λ+Δλ before sending 302 electromagnetic radiation of norm wavelength λ to receiving device 200. Thus, information 115 may be comprehensible to a human user, such as a web address written in Latin letters, may be translated and converted into the sequence of differences per time unit Δλ/t between the norm wavelength λ and the second wavelength λ+Δλ and thereby prepared for being sent according to the present method.

Information sending device 100 may, according to some embodiments of the present method, send a mark before sending electromagnetic radiation of norm wavelength λ carrying encoded information, to receiving device 200. The mark may serve as a start—signal and/or a mark between each iteration or repetition, of the information message.

The mark may be electromagnetic radiation with a certain wavelength λ, e.g., light with a certain color, which is emitted for a certain time period. The mark may however be any predetermined signal sequence or any predetermined sequence.

The mark may serve the purpose of transmitting to receiving device 200 that the encoded information will be sent after the mark. For reasons of user friendliness, the encoded information may be sent iteratively, repeating the same information message 115, such as a web address, a plurality of times. It may in such case be necessary to let the mark indicate the beginning and end, respectively, so receiving device 200 may know when to start and stop, respectively, to receive and interpret the received electromagnetic radiation.

Information sending device 100 may send electromagnetic radiation of norm wavelength λ to receiving device 200. The firstly sent norm wavelength λ of the emitted electromagnetic radiation may according to some embodiments be arbitrary.

The electromagnetic radiation of a norm wavelength λ may be emitted for an arbitrary length of time. In the case of 25 Hz, the time length is ½5 or 0.04 seconds.

The wavelength of the emitted electromagnetic radiation may, according to some embodiments, comprise light with a wavelength λ, λ+Δλ within the interval of about 10 nm to about 1 mm.

According to some embodiments, the wavelength of the emitted electromagnetic radiation may include visible light with a wavelength λ, λ+Δλ within the interval of about 400 to about 750 nm.

Information sending device 100 may send electromagnetic radiation of a second wavelength λ+Δλ to receiving device 200. The difference per time unit Δλ/t between norm wavelength λ and the second wavelength λ+Δλ represents information 115 to be sent to receiving device 200. Or rather, the difference per time unit Δλ/t represents a piece of information that is to be sent to receiving device 200, such as, e.g., a bit, a crumb (i.e. two bits), a nibble (i.e. four bits), a byte or octet (i.e. 8 bits), a word (i.e. 16 bits), a double word (i.e. 32 bits), or any other convenient piece of information size.

According to method step 304, sending device 100 may set norm wavelength λ to the second wavelength λ+Δλ, according to some embodiments.

Thus, λ(n+I)=λ(n)+Δλ, where n is the number of iterations, e.g., λ(2)=λ(I)+Δλ for n=1.

By letting the latest emitted wavelength λ+Δλ be new norm wavelength λ for the next emitted difference Δλ, the present method may be used without a previously performed calibration procedure between sending device 100 and receiving device 200.

According to method step 304, sending device 100 may iterate at least some of steps 300, 301, 302, 303, and/or 304 in the method until substantially all of information 115 has been sent to receiving device 200.

Thereby the encoding and/or sending of information 115 may be repeated until all the pieces of information 115 have been sent to receiving device 200, according to some embodiments. Thereafter, according to yet some embodiments, all of information 115 may be re-sent in a loop for a period of a predetermined length. According to some embodiments, a mark may be included within the thus created loop of emitted electromagnetic radiation, between the end of the sending of information 115 and the beginning of the next iteration of the sending of information 115.

Dataprogram

The method in information sending device 100 for receiving information 115 according to the present method may be implemented through one or more processors in sending device 100, together with computer program code for performing the functions of the present method. The program code mentioned above may also be provided as a computer program product, for instance, in the form of a data carrier carrying computer program code for performing the method according to the present invention when being loaded into a processor unit. The data carrier may be a CD ROM disc, a memory stick, or any other appropriate medium such as a disk or tape that can hold machine readable data. The computer program code may furthermore be provided as pure program code on a server and downloaded to sending device 100.

Thus, a computer program comprising instruction sets for performing the method according to steps 300-305 may be used for implementing the previously described method.

This may be performed in form of a computer program product comprising computer-readable program code embodied on a computer-readable medium, the computer readable program code being configured to carry out the method according to at least some of method steps 300-305.

The computer program code may, furthermore, according to some embodiments, be provided as pure program code on a server and downloaded to sending device 100 remotely.

Thus a computer program comprising instruction set for performing the method according to method steps 300-305 may be used for implementing the previously described method in information sending device 100 for sending information 115.

The present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in any arbitrary object oriented programming language such as Java®, Smalltalk, or C++. However, the computer program code for carrying out the steps of the present method may also be written in any conventional procedural programming languages, such as the "C" programming language and/or a lower level assembler language. The program code may execute entirely on sending device 100, partly on sending device 100, as a stand-alone software package, partly on sending device 100, and partially on a remote computing device or entirely on the remote computing device. In the latter scenario, the remote computing device may be connected to sending device 100 through a local area network (LAN) or a wide area network (WAN), or the connection may be made to an external computer, for example, through the Internet using an Internet Service Provider.

Furthermore, the present method executed in information sending device 100 to send information 115 is described in part above with reference to flowchart illustrations in FIG. 3, and also block diagrams of sending device 100 in FIG. 1 and other illustrations of embodiments in FIGS. 2A and 2B according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 4:
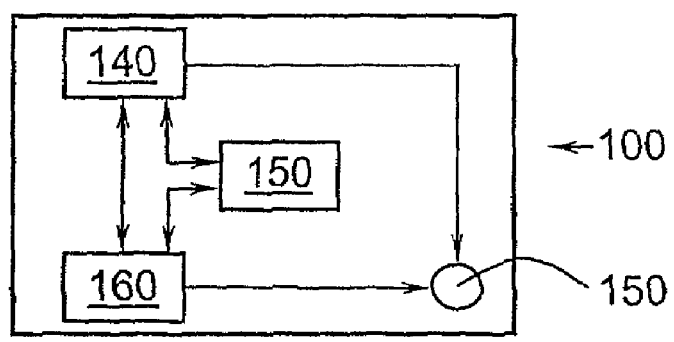
FIG. 4 is a schematic block diagram illustrating an embodiment of an information sending device.

FIG. 4 is a schematic block diagram illustrating an embodiment of sending device 100.

Sending device 100 may be configured to send information 115 to receiving device 200. Sending device 100 may include sending unit 150. Sending unit 150 may be configured to send electromagnetic radiation of norm wavelength $\lambda$ and second wavelength $\lambda+\Delta\lambda$ to receiving device 200, the difference per time unit $\Delta\lambda/t$ between norm wavelength $\lambda$ and second wavelength $\lambda+\Delta\lambda$ represents information 115 to be sent to receiving device 200.

Sending device 100 may, according to some optional embodiments, include a setting unit 140. Setting unit 140 may be configured to set norm wavelength $\lambda$ to second wavelength $\lambda+\Delta\lambda$.

Further, sending device 100 may, according to some optional embodiments, include an iteration unit 160. Iteration unit 160 may be configured to repeat the sending of electromagnetic signals until all information 115 has been sent.

According to some optional embodiments, sending unit 150 may be further configured to send a mark serving as a start signal.

In accordance with some embodiments, sending device 100 may include a converter 170. Converter 170 may be configured to convert information 115 to be sent into a sequence of differences per time unit $\Delta\lambda/t$ between norm wavelength $\lambda$ and second wavelength $\lambda+\Delta\lambda$. Information 115 may be converted before sending 302 electromagnetic radiation of norm wavelength $\lambda$ to receiving device 200.

Still further, according to some embodiments, sending device 100 may further include a display unit 120. Display unit 120 may be represented, e.g., by a cathode ray tube (CRT), liquid crystal display (LCD), plasma display panel (PDP), digital light processing (DLP), liquid crystal on silicon (LCOS), surface-conduction electron-emitter display (SED), field emission display (FED), organic light-emitting diode (OLED), organic electroluminescence (OEL), light emitting polymer (LEP), interferometric modulator (IMOD), virtual retinal display (VRD), electronic paper and/or other convenient display type able of emitting electromagnetic radiation.

Further, according to some embodiments, sending device 100 may include a hot spot area 130, situated on at least a part on display unit 120. Hot spot area 130 may be designed marked in some convenient way in order to simplify the users' identification process of the information emitting hot spot 130. Hot spot 130 may, for example, be marked with a characteristic and easily identified logotype or other distinctive mark.

Information sending device 100 may be represented by a portable communication device, such as a mobile telephone.

Any, some or all of the units 120, 130, 140, 150, 160, and/or 170 may be included within the same physical unit or units, according to some embodiments. Further, any, some or all of the units 120, 130, 140, 150, 160, and/or 170 may include further sub-units. Thus units 120, 130, 140, 150, 160 and/or 170 are to be understood as entities providing a certain specified function, not with necessity comprised within separate physical units.

Figure 5:
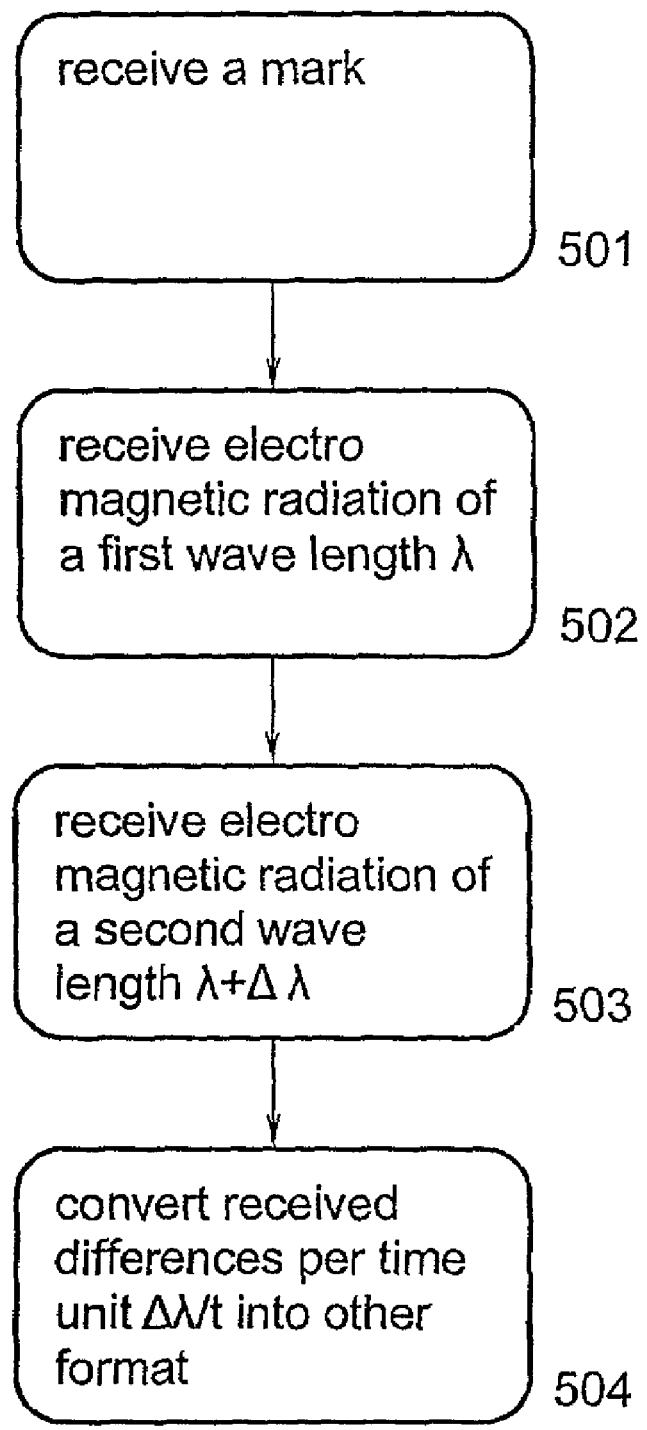
FIG. 5 is a flow chart illustrating a method in an information receiving device.

FIG. 5 is a flow chart illustrating a method in receiving device 200 for receiving information 115. The method comprises receiving information 115 from sending device 100. The receiving device 200 is adapted to receive electromagnetic radiation with different wavelength $\lambda$, $\lambda+\Delta\lambda$.

To receive the information 115, the method may include a number of steps 501-504. It is to be noted, however, that some of the described method steps are optional and only included within some embodiments. Further, it is to be noted that the method steps 501-504 may be performed in any order and that all or at least some of steps 501-504, e.g., step 501 and step 502, may be performed simultaneously or in an altered, arbitrarily decomposed, rearranged or even completely reversed order. The method may include the following steps:

Information receiving device 200 may receive a mark before starting to receive electromagnetic radiation of a norm wavelength $\lambda$, carrying encoded information, from the sending device 100. The mark may be electromagnetic radiation with a certain wavelength $\lambda$, e.g., light with a certain color, which is emitted for a certain time period. The mark may also be a certain signal sequence or any predetermined sequence.

The mark serves the purpose of alerting that the encoded information will be sent right after the mark, or starting signal. For reasons of user friendliness, the encoded information may be sent iteratively, repeating the same information message 115, such as a web address, a plurality of times in a loop. It may in such case be necessary to let the mark indicate the beginning and end, respectively, so receiving device 200 know when to start and stop, respectively, to receive and interpret the received electromagnetic radiation.

Information receiving device 200 may receive electromagnetic radiation of norm wavelength $\lambda$ from sending device 100.

Norm wavelength $\lambda$ may be any a wavelength provided in any range. According to some embodiments, wavelength $\lambda$ of the received electromagnetic radiation comprises light with a wavelength within the interval of about 10 nm to about 1 mm.

According to some embodiments, the wavelength $\lambda$ of the received electromagnetic radiation comprises visible light with a wavelength within the interval of about 400 to about 750 nm.

Information receiving device 200 receives electromagnetic radiation of second wavelength $\lambda+\Delta\lambda$ from sending device 100. The difference per time unit $\Delta\lambda/t$ between norm wavelength $\lambda$ and second wavelength $\lambda+\Delta\lambda$ may correspond to information 115 to be received from sending device 100. Or rather, the difference per time unit $\Delta\lambda/t$ may correspond to a piece of information that is received from sending device 100, such as a bit, a crumb (i.e., two bits), a nibble (i.e., four bits), a byte or octet (i.e., 8 bits), a word (i.e., 16 bits), a double word (i.e., 32 bits), or any other convenient piece of information size.

Electromagnetic radiation of second wavelength $\lambda+\Delta\lambda$ may, according to some embodiments, be received by receiving device 200 from sending device 100 with a frequency that is at least twice the sending frequency of sending device 100. According to some embodiments, electromagnetic radiation of second wavelength $\lambda+\Delta\lambda$ may be received by receiving device 200 from the sending device 100 with a frequency that is at least three times as high as the sending frequency of the sending device 100.

Step 504 is optional and only comprised within some embodiments. The received differences per time unit $\Delta\lambda/t$ between the norm wavelength $\lambda$ and second wave length $\lambda+\Delta\lambda$ are converted into another format, such as information 115 readable for human users.

The method to be used in information receiving device 200 for receiving information 115 according to the present method may be implemented through one or more processors in receiving device 200, together with computer program code for performing the functions of the method. The program code mentioned above may also be provided as a computer program product, for instance in the form of a data carrier carrying computer program code for performing the method according to the present invention when being loaded into a processor unit. The data carrier may be a CD ROM disc, a memory stick, or any other appropriate medium such as a disk or tape that can hold machine readable data. The computer program code may furthermore be provided as pure program code on a server and downloaded to receiving device 200.

Thus a computer program comprising instruction sets for performing the method according to steps 501-504 may be used for implementing the previously described method.

This may be performed in form of a computer program product including computer-readable program code embodied on a computer-readable medium, the computer readable program code being configured to carry out the method according to at least some of method steps 501-504.

The computer program code may furthermore, according to some embodiments, be provided as pure program code on a server and downloaded to the receiving device 200 remotely.

Thus a computer program comprising instruction set for performing the method according to steps 501-504 may be used for implementing the previously described method in information receiving device 200 for receiving information 115.

The present invention may take the form of an entirely hardware embodiment, a software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in any arbitrary object oriented programming language such as Java®, Smalltalk or C++. However, the computer program code for carrying out the steps of the present method may also be written in any conventional procedural programming languages, such as the "C" programming language and/or a lower level assembler language. The program code may execute entirely on receiving device 200, partly on receiving device 200, as a stand-alone software package, partly on receiving device 200 and partly on a remote computing device or entirely on the remote computing device. In the latter scenario, the remote computing device may be connected to receiving device 200 through a local area network (LAN) or a wide area network (WAN), or the connection may be made to an external computer, for example, through the Internet using an Internet Service Provider.

Furthermore, the present method in information receiving device 200 for receiving information 115 is described in part above with reference to flowchart illustrations in FIG. 5, and, also block diagrams of a sending device 100 in FIG. 1 and other illustrations of embodiments in FIGS. 2A and 2B according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 6:
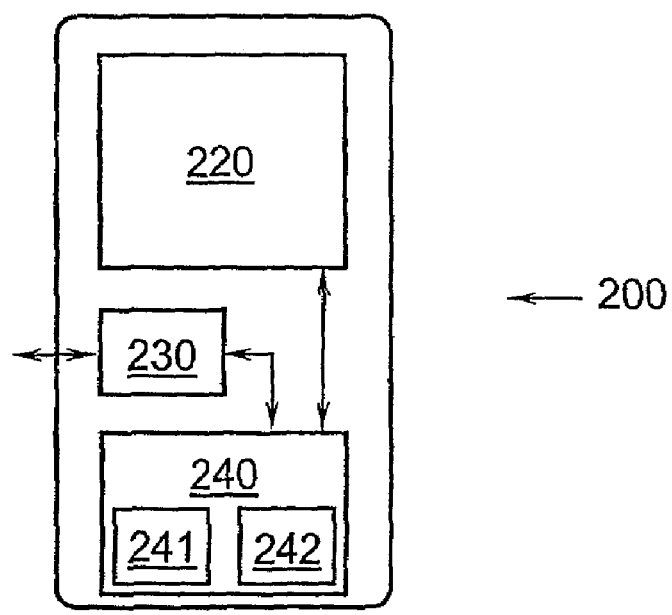
FIG. 6 is a schematic block diagram illustrating an embodiment of an information receiving device.

FIG. 6 is a schematic block diagram illustrating an embodiment of an information receiving device 200.

Receiving device 200 may be configured to receive electromagnetic radiation with different wavelengths $\lambda$, $\lambda+\Delta\lambda$. The electromagnetic radiation may be received from sending device 100. Receiving device 200 may include a receiving unit 230. Receiving unit 230 may be configured to receive electromagnetic radiation of norm wavelength $\lambda$ and second wavelength $\lambda+\Delta\lambda$. The difference per time unit $\Delta\lambda/t$ between norm wavelength $\lambda$ and second wavelength $\lambda+\Delta\lambda$ may correspond to information 115.

Receiving unit 230 may, according to some embodiments, be include a viewfinder. The viewfinder of receiving device 200 may be, e.g., a charge-coupled device (CCD), a CMOS sensor, an active pixel sensor, or other device.

Receiving unit 230 may, according to some embodiments, run with a sampling frequency n times greater than the frequency of sending device 100, where n is an integer greater than two. Thus n>2 and the sampling frequency of receiving unit 230 may, according to some embodiments, be twice the sending frequency used by sending device 100. Thereby, synchronizing sending device 100 and receiving device 200, which may be required if sending device 100 and receiving device 200 operate with the same frequency, could be omitted.

According to some embodiments, the sampling frequency of receiving device 200 may be at least three times the frequency of sending device 100 to properly read the emitted derivates per time unit $\Delta\lambda/t$.

Receiving device 200 may, according to some embodiments, include converting unit 240. Converting unit 240 may be configured to convert the received differences per time unit $\Delta\lambda/t$ between norm wavelength A and second wavelength $\lambda+\Delta\lambda$ into information 115.

Converting unit 240 may, according to some embodiments, include a control unit 241 and a memory unit 242.

Control unit 241 may be a central processing unit (CPU), a microprocessor, a peripheral interface controller (PIC) microcontroller, or any other device configured to interpret computer program instructions and processes data.

Memory unit 242 may be a primary storage memory unit, such as a processor register, a cache memory, a random access memory (RAM) or other storage device. Memory unit 242 may, however, in some embodiments, be a secondary memory unit such as a read only memory (ROM), electrically erasable programmable read-only memory (EEPROM), programmable read-only memory (PROM) or erasable programmable read-only memory (EPROM) or a hard disk drive. Memory unit 242 may however in some embodiments be an off-line storage memory unit, a flash memory, a USB memory or a memory card. Memory unit 242 may be, in some embodiments, a network-attached storage (NAS) or in fact any other appropriate medium such as a disk or a tape that can hold machine readable data.

According to some embodiments, receiving device 200 may include display unit 220 for presenting the translated received information 115 to the user.

According to some embodiments, receiving device 200 may be represented by a portable communication device, such as a mobile telephone.

According to some embodiments, receiving device 200 may be configured to initiate the information receiving method when the camera lens cover on the information receiving device 200 is removed. As the information receiving unit 230 may be integrated with camera viewfinder 220, it may enable quick and easy access to the transmitted information, without even having to take a picture.

Any, some or all of units 220, 230, 240, 241 and/or 242 may be comprised within the same physical unit or units, according to some embodiments. Further, any, some or all of the units 220, 230, 240, 241 and/or 242 may comprise further sub units. Thus units 220, 230, 240, 241 and/or 242 are to be seen rather as entities providing a certain specified function, not with necessity comprised within separate physical units.

Figure 7:
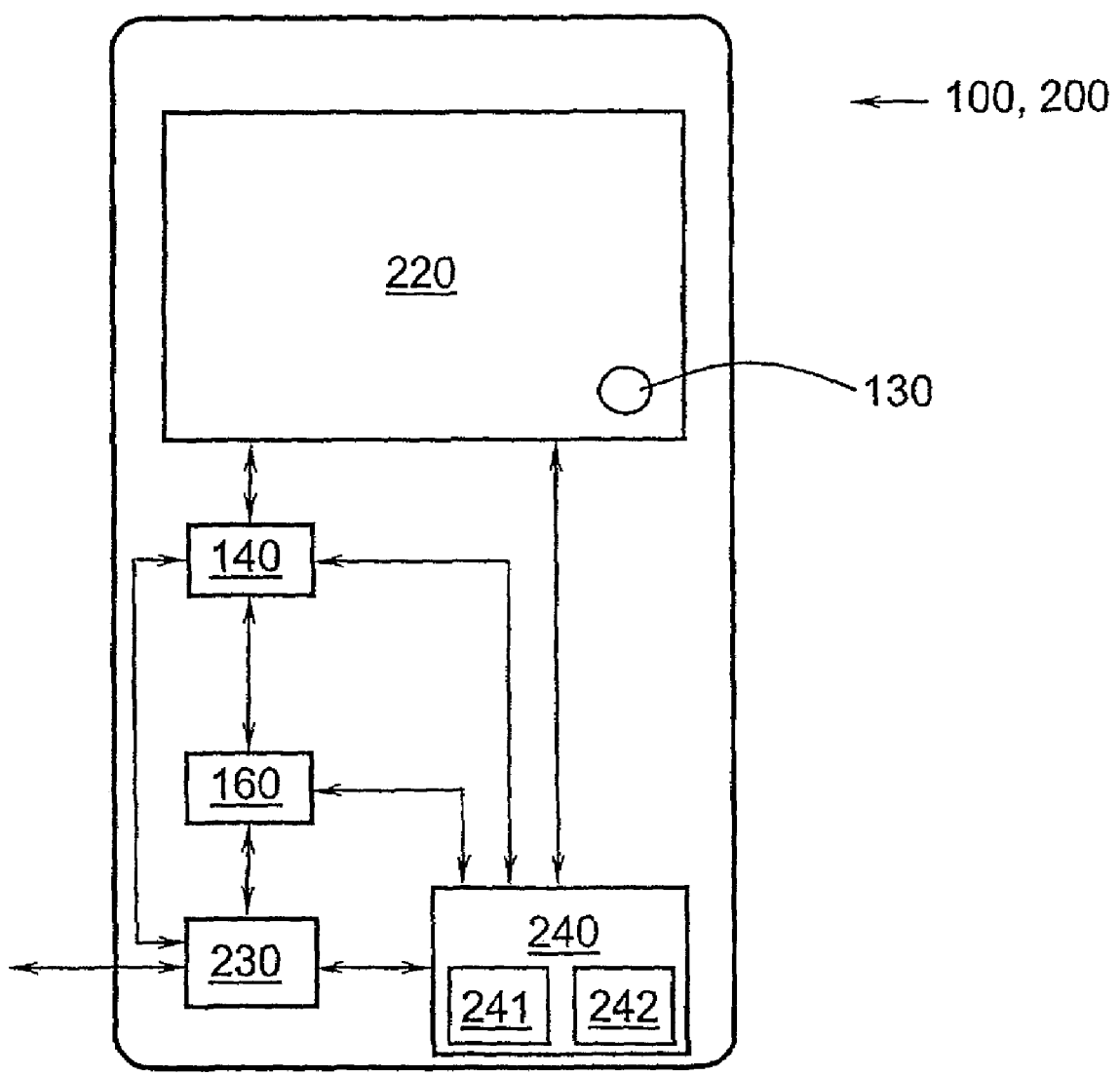
FIG. 7 is a schematic block diagram illustrating an embodiment of a combined information sending and receiving device.

FIG. 7 is a schematic block diagram illustrating an embodiment of a combined information sending and receiving device 100, 200.

Sending and receiving device 100, 200 may be configured to emit and receive electromagnetic radiation with different wavelengths $\lambda$, $\lambda+\Delta\lambda$. Sending and receiving device 100, 200 may include a sending unit 220. Sending unit 220 may be configured to send electromagnetic radiation of norm wavelength $\lambda$ and second wavelength $\lambda+\Delta\lambda$. The difference per time unit $\Delta\lambda/t$ between norm wavelength $\lambda$ and second wavelength $\Delta+\Delta\lambda$ may correspond to information 115.

Sending unit 220 may be include a cathode ray tube (CRT), liquid crystal display (LCD), plasma display panel (PDP), digital Light processing (DLP), Liquid crystal on silicon (LCOS), surface-conduction electron-emitter display (SED), field emission display (FED), organic light-emitting diode (OLED), organic electro-luminescence (OEL), light emitting polymer (LEP), interferometric modulator (IMOD), virtual retinal display (VRD), electronic paper and/or other convenient display type able of emitting electromagnetic radiation.

Further, according to some embodiments, sending and receiving device 100, 200 may include hot spot area 130, situated on at least a part on sending unit 220. Hot spot 130 may be designed or marked in some convenient way to simplify the users' identification process of the information emitting hot spot area 130. Hot spot 130 may, e.g., be marked with a characteristic and easily identified logotype or other distinctive mark.

Further, sending and receiving device 100, 200 may include a receiving unit 230. Receiving unit 230 may be configured to receive electromagnetic radiation of norm wavelength $\lambda$ and second wavelength $\lambda+\Delta\lambda$.

Receiving unit 230 may, according to some embodiments, include a viewfinder. The viewfinder of sending and receiving device 100, 200 may be, e.g., a charge-coupled device (CCD), a CMOS sensor, an active pixel sensor or similar device.

Sending and receiving device 100, 200 is, according to some embodiments, configured to operate in a sending mode and a receiving mode.

According to some optional embodiments, sending and receiving device 100, 200 may include a setting unit 140. Setting unit 140 may be configured to set norm wavelength $\lambda$ to second wavelength $\lambda+\Delta\lambda$.

Further, sending and receiving device 100, 200 may, according to some optional embodiments, comprise an iteration unit 160. Iteration unit 160 may be configured to repeat the sending of electromagnetic signals until all information 115 has been sent, when operating in sending mode.

According to some optional embodiments, sending unit 150 may be further configured to send a mark when sending and receiving device 100, 200 operates in sending mode.

In accordance with some embodiments, sending and receiving device 100, 200 may include a converter 170. Converter 170 may be configured to convert: information 115 to be sent, into a sequence of differences per time unit $\Delta\lambda/t$ between norm wavelength $\lambda$ and second wavelength $\lambda+\Delta\lambda$. Information 115 may be converted before sending 302 electromagnetic radiation of norm wavelength $\lambda$ when sending and receiving device 100, 200 is operating in sending mode.

Sending and receiving device 100, 200 may be represented by a portable communication device, such as a mobile telephone.

Sending and receiving device 100, 200 may, according to some embodiments include a converting unit 240. Converting unit 240 may be configured to convert the received differences per time unit $\Delta\lambda/t$ between the norm wavelength $\lambda$ and the second wavelength $\lambda+\Delta\lambda$ into information 115 when the sending and receiving device 100, 200 is operating in reception mode.

Converting unit 240 may, according to some embodiments, include a control unit 241 and a memory unit 242.

Control unit 241 may be a central processing unit (CPU), a microprocessor, a peripheral interface controller (PIC) microcontroller or any other appropriate device configured to interpret computer program instructions and processes data.

Memory unit 242 may be a primary storage memory unit such as a processor register, a cache memory, a random access memory (RAM) or other storage device. Memory unit 242 may, in some embodiments, however, be a secondary memory unit such as a read only memory (ROM), electrically erasable programmable read-only memory (EEPROM), programmable read-only memory (PROM) or erasable programmable read only memory (EPROM) or a hard disk drive. Memory unit 242 may, in some embodiments, however, be an off-line storage memory unit, a flash memory, a USB memory or a memory card. The memory unit 242 may in some embodiments be a network-attached storage (NAS) or in fact any other medium, such as a disk or a tape, that can hold machine readable data.

Display unit 220 of sending and receiving device 100, 200 may, according to some embodiments, be configured to present the translated received information 115 to the user. Received information 115 may thus be read and understood by a human user, who also thereby gets a confirmation that the requested information has been received.

Any, some, or all of units 120, 130, 140, 150, 160, 170, 220, 230, 240, 241 and/or 242 may be included within the same physical unit or units, according to some embodiments. Further, any, some, or all of the units 120, 130, 140, 150, 160, 170, 220, 230, 240, 241 and/or 242 may comprise further sub-units. Thus, units 120, 130, 140, 150, 160, 170, 220, 230, 240, 241 and/or 242. are to be understood rather as entities providing a certain specified function, not with necessity comprised within separate physical units.

The present methods, devices, and computer programs may be used when transferring information 130, such as a web address, from, for example, a TV screen 100 to a mobile phone 200. Thus, the tedious process of writing and spelling a long web address, or other information, on the limited keyboard of mobile phone 200 may be omitted.

According to some embodiments, the present methods, devices, and computer programs may be used when making a purchase, or a donation, e.g., a TV sent charity event may request for a small donation. The user may aim the information receiving device 200 towards the information emitting area 130 and present the option of making a donation, e.g., by making a telephone call to a certain telephone number.

According to some embodiments, the present methods, devices, and computer programs may be used when downloading, e.g., a game from a DVD. On the DVD, the user may be instructed to either tap in a web address in the web browser of the information receiving device 200, or the web address may be transferred by the present methods, devices, and computer programs.

According to some embodiments, however, the present methods, devices, and computer programs may be used when transferring information from one portable electronic device 100, such as a mobile telephone, to another portable electronic device 200, such as a mobile telephone. In that way, it may be possible to transfer, e.g., contact information, etc., to a user without having to tap in the recipient's phone number and send, for example, an SMS. It may also be possible, for example, for a lecturer to broadcast his/her contact information or other information in a convenient way to a plurality of persons in an audience, without having to manually record information.

According to some embodiments, the present methods, devices, and computer programs may be used, for example, in a supermarket to receive additional information concerning a product exposed on a commercial screen or other media.

According to some embodiments, the present methods, devices, and computer programs may be used as a security enhancing mechanism for authentication, for example, for entering an identification code into an automated teller machine (ATM).

According to some embodiments, the present methods, devices, and computer programs may be used as a security enhancing mechanism for authentication, for example, for entering an entrance code into a reader controlling the lock to a door.

According to some embodiments, the present methods, devices, and computer programs may be used as a security enhancing mechanism for authentication for, for example, entering an identification code into a computer interface when logging into a certain computer application.

According to some embodiments, the present methods, devices, and computer programs may be used, for example, at a movie theatre, which may broadcast the movies currently playing at the theater so that users passing by the movie theater can view the movie schedule on their mobile phones 200.

According to some embodiments, the present methods, devices, and computer programs may be used, for example, when purchasing a cinema ticket. The ticket may then be downloaded to a mobile phone from a screen. When the user enters the cinema, a ticket controller may verify the authenticity of the ticket by letting the user emit the ticket using the present method.

According to some embodiments, a queue ticket may be downloaded from sending device 100 to mobile receiving device 200, for example, a queue ticket to a state liquor shop.

Like reference numbers may signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present.

Furthermore, "connected" or "coupled" as used herein may include wirelessly connected or coupled. As used herein, the term "and/or includes any and all combinations of one or more of the associated listed items.

Unless otherwise defined, all terms including technical and scientific terms used herein have the same meaning as commonly understood by one of ordinary skill in the art to which sending device 100, the method for sending information, receiving device 200, the method for receiving information and the computer programs for performing the methods belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. In a sending device, a method of sending information to a receiving device, wherein the sending device comprises a display unit and a hot spot of the display unit, which hot spot is configured to emit visible light of various wavelengths ($\lambda$, $\lambda+\Delta\lambda$), the method comprising:

converting the information to be sent, into a sequence of differences per time unit (Δλ/t) between a norm wavelength (λ) and a second wavelength (λ+Δλ), sending a marker comprising light with a certain color, which is emitted for a certain time period to the receiving device, sending visible light of the norm wavelength (λ) to the receiving device; and sending visible light of the second wavelength (λ+Δλ) to the receiving device, wherein the per time unit (Δλ/t) between the norm wavelength (λ) and the second wavelength (λ+Δλ) corresponds to the information to be sent to the receiving device, while the firstly sent norm wavelength (λ) of the visible light is arbitrary.

2. The method of claim 1, further comprising:
setting the norm wavelength (λ) to the second wavelength (λ+Δλ), and
iterating the sending and the setting until all of the information has been sent to the receiving device.

3. The method of claim 1, wherein the wavelength of the sent light comprises visible light having a wavelength (λ, λ+Δλ) in a range of between about 400 and about 750 nm.

4. The method of claim 1, wherein the visible light is sent on a plurality of channels, using a plurality of norm wavelengths (λ) simultaneously.

5. A computer program product comprising computer-readable program code embodied on a computer-readable medium, the computer readable program code being configured to perform the method of claim 1.

6. A sending device, comprising a display unit and a hot spot of the display unit, for sending information to a receiving device, which hot spot is configured to send visible light with different wave length (λ, λ+Δλ), which sending device comprising:

a converter, configured to convert the information to be sent, into a sequence of differences per time unit (Δλ/t) between a norm wavelength (λ) and a second wavelength (λ+Δλ) before sending visible light of the norm wavelength (λ) to the receiving device, and a sending unit, comprising the hot spot, configured to send visible light of the norm wavelength (λ) and the second wavelength (λ+Δλ) to the receiving device, wherein the difference per time unit (Δλ/t) between the norm wavelength (λ) and the second wavelength (λ+Δλ) corresponds to the information to be sent to the receiving device while the wavelength (λ) of the visible light is arbitrary, and wherein the sending unit is further adapted to send a marker, comprising light with a certain color, which is emitted for a certain time period.

7. The device of claim 6, further comprising:
a setting unit, configured to set the norm wavelength (λ) to the second wavelength (λ+Δλ).

8. The device of claim 6, further comprising:
an iteration unit, configured to repeat the sending of visible light until all of the information has been sent.

9. The device of claim 6, wherein the sending device comprises a portable communication device.

10. The device of claim 6, wherein the sending device is further configured to receive visible light having varying wavelengths (λ, λ+Δλ), the sending device comprising:
a receiving unit, adapted to receive visible light of the norm wavelength (λ) and the second wavelength (λ+Δλ), wherein the difference per time unit (Δλ/t) between the norm wavelength (λ) and the second wavelength (λ+Δλ) corresponds to information.

11. In a receiving device, a method for receiving information from a sending device, wherein the receiving device is configured to receive electromagnetic radiation having different wavelengths (λ, λ+Δλ), the method comprising:
receiving a marker from the sending device,
receiving visible light of a norm wavelength (λ) from the sending device,
receiving visible light of a second wavelength (λ+Δλ) from the sending device, wherein the difference per time unit (λ+Δλ) between the norm wavelength (λ) and the second wavelength (λ+Δλ) corresponds to the information to be received from the sending device, and
converting the received differences per time unit (Δλ/t) between the norm wavelength (λ) and the second wavelength (λ+Δλ) into the information.

12. The method of claim 11, wherein the wavelength (λ) of the received light comprises visible light having a wavelength (λ) in a range of between about 400 and about 750 nm.

13. A computer program product comprising computer-readable program code embodied on a computer-readable medium, the computer readable program code being configured to perform the method of claim 11.

14. A receiving device adapted to receive visible light having different wavelengths (λ, λ+Δλ) from a sending device, the receiving device comprising:

a camera, configured to receive visible light of a norm wavelength (λ) and a second wavelength (λ+Δλ), wherein the difference per time unit (Δλ/t) between the norm wavelength (λ) and the second wavelength (λ+Δλ) corresponds to information, a converting unit, configured to convert the received differences per time unit (Δλ/t) between the norm wavelength (λ) and the second wavelength (λ+Δλ) into the information, and a display unit for presenting the translated received information to the user.

15. The receiving device of claim 14, wherein the information receiving device comprises a portable communication device.

16. The receiving device of claim 14, wherein the information receiving device is further configured to send information, the receiving device comprising:
a display unit configured to send visible light of a norm wavelength (λ) and a second wavelength (λ+Δλ), wherein the difference per time unit (Δλ/t) between the norm wavelength (λ) and the second wavelength (λ+Δλ) corresponds to the information to be sent.

* * * * *